United States Patent [19]

McNulty

[11] 4,435,242
[45] Mar. 6, 1984

[54] ELONGATE STRUCTURE

[75] Inventor: John P. McNulty, Cotham, England

[73] Assignee: Bristol Composite Materials Engineering Limited, Bristol, England

[21] Appl. No.: 442,255

[22] Filed: Nov. 17, 1982

[30] Foreign Application Priority Data

Nov. 26, 1981 [GB] United Kingdom ............... 8135717

[51] Int. Cl.³ .................... B32B 31/04; B32B 31/30
[52] U.S. Cl. ............................. 156/264; 156/244.18; 156/304.2; 428/36
[58] Field of Search .............. 156/63, 244.18, 264, 156/304.1, 304.2, 304.5; 428/36

[56] References Cited

U.S. PATENT DOCUMENTS

| 2,364,849 | 12/1944 | Ibbotson et al. | 156/304.1 |
| 2,382,208 | 8/1945 | Corbin | 156/264 |
| 4,050,490 | 9/1977 | Werner | 156/264 |
| 4,066,489 | 1/1978 | Hannum et al. | 156/304.1 |

Primary Examiner—Michael G. Wityshyn
Attorney, Agent, or Firm—Morgan, Finnegan, Pine, Foley & Lee

[57] ABSTRACT

A method of fabricating a tapered elongate structure in which a polygonal tube or channel cross section member is cut lengthwise and at an angle to its longitudinal axis to produce a plurality of similar segments of tapered shape. The segments are then arranged in an abutting or overlapping relationship and bonded together to form the tapered elongate structure.

6 Claims, 4 Drawing Figures

ELONGATE STRUCTURE

The present invention relates to elongate structures and more particularly to the fabrication of elongate tapering structures.

For certain applications, tapered elongate structures of fibre glass/resin composition are required. An example of such an application is the use of hollow tapered telegraph poles, the requirement being for a pole of aesthetic appearance and having minimum wall thickness at the top where maximum strength is unnecessary and for economy of construction. Conventional filament winding techniques onto a mandrel produces a pole having an unsatisfactory weight balance and insufficient axially oriented fibres. Centrifugal casting involves allowing centrifugal action to force pre-cut lengths of fibreglass fabric and resin against the walls of a rotating mandrel prior to and during cure. This technique although feasible is labor intensive and lacks flexibility and involves expenditure on matched metal moulds.

The present invention is directed towards a technique for producing tapered elongate structures having axial strength and avoiding the use of centrifugal casting and filament winding techniques.

Thus according to the present invention there is provided a method of fabricating a tapered elongate structure comprising the steps of:
(a) producing a longitudinal member in the form of a tube of even number sided polygonal uniform cross-section or of a circular cross section or a channel cross section member,
(b) cutting the member lengthwise and at an angle to the longitudinal axis so as to produce a plurality of similar segments of tapered shape,
(c) arranging the segments in an overlapping or abutting relationship so as to form a tapered configuration and
(d) bonding the segments at the overlap or abutment areas to form the tapered elongate structure.

The tapered elongate structures may be of circular or of even number sided polygonal cross-section. Examples of these include square and hexagonal cross-sections. A typical elongate structure envisaged is a telegraphic pole.

The longitudinal member in the form of circular or even number sided polygonal cross-sectional or channel cross member may be produced continuously by an extrusion technique. In the case of fabrication of telegraphic poles fabricated from resin/glass fibre, production may be by continuous pultrusion of a mainly axially oriented fibre/resin product to obtain the necessary strength and rigidity. In the pultrusion technique, resin impregnated fibres are drawn through a die tube having an inside configuration to form the required shape of the final product e.g. hexagonal, etc. while passing through the die tube, the resin/fiber material is treated and cured to form the longitudinal member. In the case of fabricating tapered elongate structures from metals, conventional metal extrusion techniques may be used.

The resultant longitudinal member may be cut by a suitable cutting technique.

A high speed diamond wheel type of cutter may be suitably mounted on a straight guide bar set at the required angle and capable of traversing the length of the glass fibre reinforced plastic (GRP) section. Alternatively, the cutting head may be in a fixed position and the GRP section may be traversed past it at the required angle.

The cut is made along and at an angle to the longitudinal axis to produce similar segments of tapered shape and of the same surface area. Preferably, the cut is made so each segment comprises a pair of non-planar similar wings about a longitudinal crease, the wings having an included angle of 90° or more. In general in the case of polygonal longitudinal members, one cut per face would be usual. However, it is also envisaged that for example more than one cut on each face could be used to produce a segment of more complex configuration but which could still be overlapped to produce a tapered elongate structure.

The segments may be bonded together by suitable techniques such as use of adhesives, by welding etc. dependent upon the nature of the materials being used. In order to produce a strong structure, the segments preferably require to be overlapped to provide an adequate bond area.

The invention will now be described by way of example only and with reference to FIGS. 1 and 2 of the accompanying drawings.

The following description shows the production of two examples of tapered elongate structures according to the invention in the form of tapered poles.

Lengths of channel cross section material comprising resin/glass fibre material were produced from a material of uniform width by an automated fabrication technique for laying resin impregnated glass cloth or by a modified extension technique. The channel cross section was cut to a suitable length by a flying saw arrangement, FIG. 1(a). Each piece of the channel cross section material 1 was then cut longitudinally and at an angle along the line marked by numeral 2 by a saw bench arrangement to produce a pair of similar segments 3 having a narrow end edge length of B and a wide end edge length of A. Each segment 3 has a central bend or fold producing a pair of wings having an obtuse included angle.

Figures 1A, 1B:
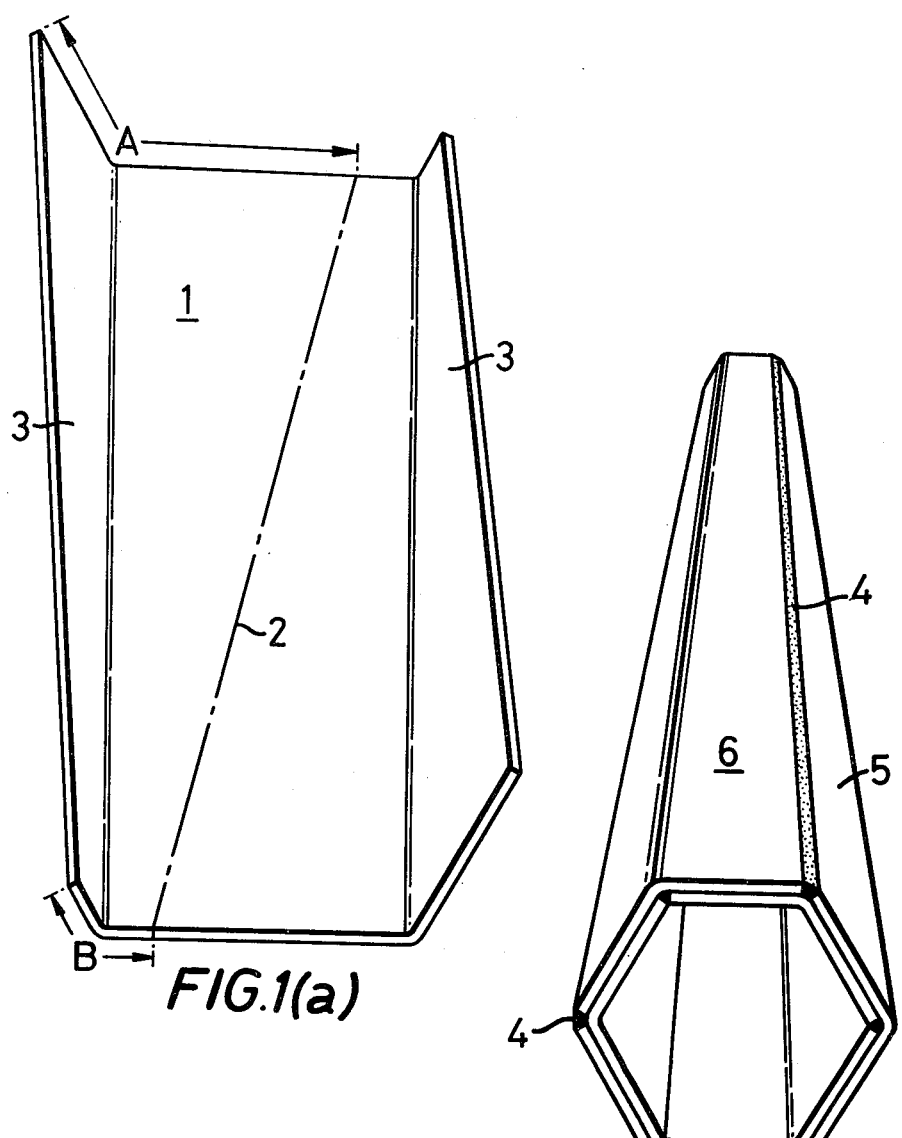
FIG. 1(a) is a perspective view of a channel cross section length of material of uniform thickness, the line of cut being indicated.
FIG. 1(b) is a perspective view of a tapered pole assembly formed by overlapping six segments of the type indicated in FIG. 1(a).

Three of the segments 3 were then positioned in a holding device (not shown) with adjacent longitudinal edges 4 touching to form a single thickness tapered pole configuration. The segments 3 were permanently fixed in this configuration by application of an adhesive. Then three further segments 5 were assembled and bonded to the configuration to produce a completed basic tapered pole 6 as shown in FIG. 1(b). The pole 6 can then be trimmed and have the necessary cut outs and adaptions made to it.

Figure 2A:
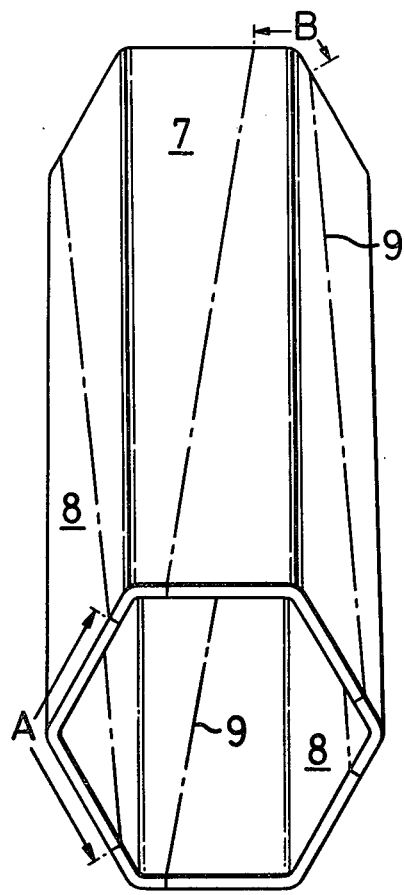
FIG. 2(a) is a perspective view of an extruded tube of hexagonal cross section, the line of cut being indicated on each face.

FIG. 2 illustrates the way in which a tapered pole can be fabricated from an even side polygonal tube. Thus a hexagonal tube of resin/fibre glass was produced by pultrusion and cut by a flying saw arrangement into suitable lengths. The material was a mainly axial glass fibre reinforcement of rovings and a chopped strand type of material to give lateral strength. Each length 7 of pultruded tube was cut along each face by a saw bench arrangement to produce six similar segments 8, having a narrow end length of B and a wide end length of A. The line of cut is marked by numeral 9.

Figure 2B:
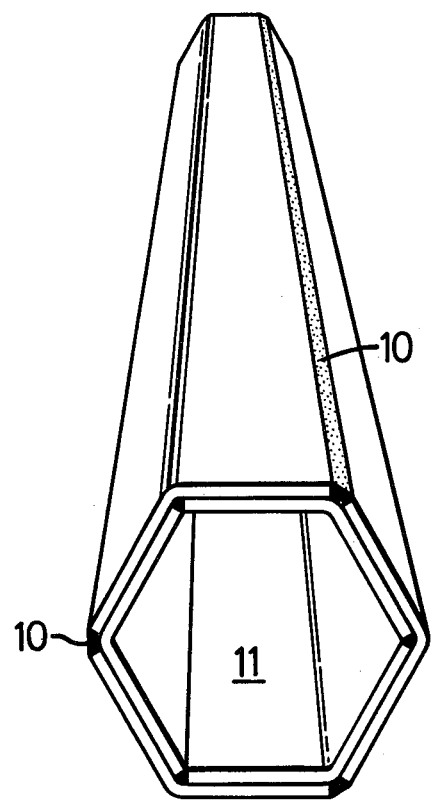
FIG. 2(b) is a perspective view of a six sided tapered pole formed by overlapping and bonding six segments as indicated in FIG. 2(a).

Three of the segments 8 were then placed in a holding device (not shown) with adjacent longitudinal edges 10 touching to form a single thickness tapered pole configuration, the configuration being fixed with adhesive. Three further segments were then assembled over the first set of segments and bonded with adhesive to produce the completed tapered pole as shown in FIG. 2(b).

I claim:

1. A method of fabricating a tapered elongate structure comprising the steps of (a) producing a longitudinal member in the form of a tube of even number sided polygonal uniform cross section or of a circular cross-section, or a channel cross section member, (b) cutting the member lengthwise and at an angle to the longitudinal axis so as to produce a plurality of similar segments of tapered shape, (c) arranging the segments in an abutting or overlapping relationship so as to form a tapered configuration and (d) bonding the segments at the abutment or overlap areas to form the tapered elongate structure.

2. A method according to claim 1 in which the cut is made to form segments comprising a pair of non-planar similar wings about a longitudinal crease, the wings making an obtuse included angle.

3. A method according to claim 1 or claim 2 in which more than one cut is made on each face of the longitudinal member.

4. A method according to claim 1 in which a further set of segments are arranged adjacent to and are bonded to the first set of abutting or overlapping segments.

5. A method according to claim 1 in which the tube of even numbered polygonal uniform cross section has a square or hexagonal cross section.

6. A method according to claim 1 in which the longitudinal member comprises a resin/fibre composite tube.

* * * * *